US009014958B2

(12) United States Patent
Yamamoto et al.

(10) Patent No.: US 9,014,958 B2
(45) Date of Patent: Apr. 21, 2015

(54) CONTROL APPARATUS, DISPLAY APPARATUS, COOPERATIVE OPERATION SYSTEM, AND CONTROL METHOD

(75) Inventors: Noritaka Yamamoto, Minato-ku (JP); Yosukemarukosu Hasebe, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/993,909

(22) PCT Filed: Jan. 25, 2012

(86) PCT No.: PCT/JP2012/051504

§ 371 (c)(1), (2), (4) Date: Jun. 13, 2013

(87) PCT Pub. No.: WO2012/132522

PCT Pub. Date: Oct. 4, 2012

(65) Prior Publication Data

US 2013/0268183 A1 Oct. 10, 2013

(30) Foreign Application Priority Data

Mar. 29, 2011 (JP) ................................ 2011-073598

(51) Int. Cl.

*G06F 19/00* (2011.01)
*G08G 5/00* (2006.01)
*F41H 11/00* (2006.01)

(52) U.S. Cl.

CPC .............. *G08G 5/0095* (2013.01); *F41H 11/00* (2013.01)

(58) Field of Classification Search

CPC .............................. G08G 5/0095; F41H 11/00
USPC .......................................................... 701/120
See application file for complete search history.

(56) References Cited

U.S. PATENT DOCUMENTS 4,649,390 A 3/1987 Andrews et al.
4,843,459 A 6/1989 Perrin et al.

(Continued)

FOREIGN PATENT DOCUMENTS

EP 2 199 746 6/2010
JP 60-501974 11/1985

(Continued)

OTHER PUBLICATIONS

International Search Report issued May 1, 2012 in International Application No. PCT/JP2012/051504.

(Continued)

*Primary Examiner* — Mary Cheung
*Assistant Examiner* — Anne Mazzara
(74) *Attorney, Agent, or Firm* — Wenderoth, Lind & Ponack, LLP

(57) ABSTRACT

An operation system for cooperatively responding to a target moving in the air by an aircraft and a flying object launched from a launch facility. A control facility (16) receives target information including information indicating a position of a target aircraft (18) moving in the air, and SAM information including information indicating a position of a SAM (20) launched from a launch facility (12) toward the target aircraft (18). The control facility (16) then calculates a course of the SAM (20) heading for the target aircraft (18) based on the received target information and SAM information as a no-fly zone of an aircraft (14) that responds to the target aircraft (18).

6 Claims, 6 Drawing Sheets

(56) References Cited

U.S. PATENT DOCUMENTS

| | | | | |
|---|---|---|---|---|
| 5,112,006 | A * | 5/1992 | Palmer | 244/3.16 |
| 5,631,640 | A | 5/1997 | Deis et al. | |
| 6,739,547 | B2 * | 5/2004 | Redano | 244/3.14 |
| 6,804,495 | B2 * | 10/2004 | Duthie | 455/67.11 |
| 7,875,837 | B1 * | 1/2011 | Szabo et al. | 244/3.15 |
| 2007/0139252 | A1 * | 6/2007 | Barry et al. | 342/29 |
| 2009/0125221 | A1 | 5/2009 | Estkowski et al. | |
| 2010/0026554 | A1 * | 2/2010 | Longman et al. | 342/62 |

FOREIGN PATENT DOCUMENTS

| | | |
|---|---|---|
| JP | 63-75492 | 4/1988 |
| JP | 2002-195795 | 7/2002 |
| JP | 2003-212193 | 7/2003 |
| JP | 3442786 | 9/2003 |
| JP | 2004-25966 | 1/2004 |
| JP | 2007-17307 | 1/2007 |
| JP | 2007-237873 | 9/2007 |
| JP | 2007-279308 | 10/2007 |
| JP | 2010-231382 | 10/2010 |

OTHER PUBLICATIONS

Written Opinion of the International Searching Authority issued May 1, 2012 in International Application No. PCT/JP2012/051504.

Extended European Search Report issued Aug. 11, 2014 in corresponding European patent application No. 12763721.3.

* cited by examiner

CONTROL APPARATUS, DISPLAY APPARATUS, COOPERATIVE OPERATION SYSTEM, AND CONTROL METHOD

BACKGROUND OF THE INVENTION

1. Technical Field

The present invention relates to a control apparatus, a display apparatus, a cooperative operation system, and a control method.

2. Description of the Related Art

Under a situation where a target moving in the air (for example, a threatening aircraft) coexists with an aircraft that searches and tracks or intercepts the target, it is important for a pilot of an aircraft to appropriately identify the target, and also to appropriately respond to the target.

A display apparatus set forth in Japanese Unexamined Patent Application, Publication No. 2007-279308 is provided with: an input unit for inputting information that specifies a behavioral status of an object to be displayed; and a processing unit that assigns the information that specifies the behavioral status to a portion in a shape of a symbol of the object to be displayed, and changes a size of the corresponding portion of the symbol according to the change of the behavioral status of the object to be displayed. As a result of this, the display apparatus set forth in JP 2007-279308 can appropriately identify the object to be displayed on the display apparatus mounted in an aircraft, and further can reduce a user load required for the identification.

SUMMARY OF THE INVENTION

1. Technical Problem

However, with the display apparatus set forth in JP 2007-279308, a target can be identified, but it is the pilot of the aircraft who determines the response to the target, and a situation also occurs where taking an appropriate response to the target is difficult.

The situation where taking the appropriate response to the target is difficult is, for example, a case where the aircraft and a launch facility deployed on the ground for launching a flying object toward the target cooperatively respond to the target. In such case, it is difficult for the pilot to determine which of the aircraft or the launch facility takes response (interception) to the target. In addition, when the launch facility launches the flying object toward the target, it may also be difficult for the pilot to determine which course the aircraft should take to the target.

The present invention has been made in view of such circumstances, and its object is to provide a control apparatus, a display apparatus, a cooperative operation system, and a control method with which an aircraft and a flying object launched from a launch facility can cooperatively appropriately respond to a target moving in the air.

2. Solution to the Problem

In order to solve the above-described problems, a control apparatus, a display apparatus, a cooperative operation system, and a control method of the present invention employ the following solutions.

Specifically, a control apparatus according to a first aspect of the present invention is provided with: an acquisition unit that acquires target information including information indicating a position of a target moving in the air, and flying object information including information indicating a position of a flying object launched from a launch facility toward the target; and a calculation unit that calculates, as a zone where a flight of an aircraft that responds to the target is forbidden, a course of the flying object heading for the target based on the target information and the flying object information that have been acquired by the acquisition unit.

According to the first aspect of the present invention, by the acquisition unit, acquired are the target information including the information indicating the position of the target moving in the air, and the flying object information including the information indicating the position of the flying object launched from the launch facility toward the target.

The target is, for example, a threatening aircraft as an object of search and tracking. In addition, the launch facility is deployed, for example, on the ground.

By the calculation unit, the course of the flying object heading for the target based on the target information and the flying object information that have been acquired by the acquisition unit is then calculated as a no-fly zone where the aircraft that responds to the target is forbidden to fly.

Namely, in intercepting the target by cooperative operation of the aircraft and the flying object, when the aircraft is located on the course to the target of the flying object, appropriate response to the target becomes difficult. Consequently, in the first aspect of the present invention, determination of a flight path of the aircraft by the pilot of the aircraft can be appropriately performed by calculating the course of the flying object as the no-fly zone of the aircraft, and thus the aircraft and the flying object launched from the launch facility can cooperatively appropriately respond to the target.

In addition, in the control apparatus according to the first aspect of the present invention, the no-fly zone may be a predetermined zone including a straight line indicating the course of the flying object heading for the target (a second aspect).

According to the second aspect of the present invention, since the no-fly zone of the aircraft may be a predetermined zone including the straight line indicating the course of the flying object heading for the target, a margin of safety in which the aircraft and the flying object do not approach too close to each other is included in the no-fly zone, and thus safety of the flight path of the aircraft can be more enhanced.

In addition, in the control apparatus according to the first or second aspect of the present invention, the no-fly zone may include a predetermined zone including a position where the flying object reaches the target (a third aspect).

According to the third aspect of the present invention, the predetermined zone including the position where the flying object reaches the target is included in the no-fly zone of the aircraft. When the flying object reaches the target, the target is exploded, and thus when the aircraft approaches the target too close, the aircraft may be involved in an explosion of the target. Therefore, in the third aspect of the present invention, the predetermined zone for the aircraft not to be involved in the explosion is included in the no-fly zone, and thus safety of the flight path of the aircraft can be more enhanced.

In addition, in the control apparatus according to any of the first to third aspects of the present invention, the calculation unit may execute interception selection processing to select whether the target is intercepted by the aircraft or by the flying object based on a first required time for the aircraft to reach the target, and a second required time for the flying object to reach the target (a fourth aspect).

According to the fourth aspect of the present invention, it is not necessary to determine whether or not interception to the target by the pilot of the aircraft is needed, and the target can be shot down easily and sooner.

Meanwhile, a display apparatus according to a fifth aspect of the present invention is the display apparatus that is mounted in the aircraft, and displays a positional relationship between an own aircraft and the target, and the display apparatus displays the zone calculated by the control apparatus according to any of the first to third aspects together with a positional relationship between the own aircraft and the target.

According to the fifth aspect of the present invention, the zone where the flight of the aircraft is forbidden, the zone having been calculated by the control apparatus, is displayed on the display apparatus mounted in the aircraft together with the positional relationship between the own aircraft and the target, and thus the pilot of the aircraft can easily and reliably confirm the zone where the flight of the own aircraft is forbidden.

In addition, the display apparatus according to the fifth aspect of the present invention may display a selection result of the interception selection processing by the control apparatus pertaining to the fourth aspect (a sixth aspect).

According to the sixth aspect of the present invention, the pilot of the aircraft can easily and reliably confirm whether or not the own aircraft intercepts the target.

In addition, a cooperative operation system according to a seventh aspect of the present invention is provided with: a control facility that has the control apparatus pertaining to any of the first to third aspects; an aircraft that responds to a target moving in the air, and can transmit and receive various information to and from the control facility; and a launch facility that launches a flying object toward the target, and is capable of transmitting and receiving various information to and from the control facility.

According to the seventh aspect of the present invention, the aircraft and the flying object launched from the launch facility can cooperatively appropriately respond to the target.

Furthermore, a control method according to an eighth aspect of the present invention includes: a first step of acquiring target information including information indicating a position of a target moving in the air, and flying object information including information indicating a position of a flying object launched from a launch facility toward the target; and a second step of calculating as a zone where a flight of an aircraft that responds to the target is forbidden a course of the flying object heading for the target based on the acquired target information and flying object information.

According to the eighth aspect of the present invention, determination of a flight path of the aircraft by a pilot of the aircraft can be appropriately performed by calculating the course of the flying object as a no-fly zone of the aircraft, and thus the aircraft and the flying object launched from the launch facility can cooperatively appropriately respond to the target.

3. Advantageous Effects of the Invention

The present invention has an excellent effect that the aircraft and the flying object launched from the launch facility can cooperatively appropriately respond to the target moving in the air.

DETAILED DESCRIPTION OF THE INVENTION

Hereinafter, there will be described one embodiment of a control apparatus, a display apparatus, a cooperative operation system, and a control method pertaining to the present invention with reference to drawings.

Figure 1:
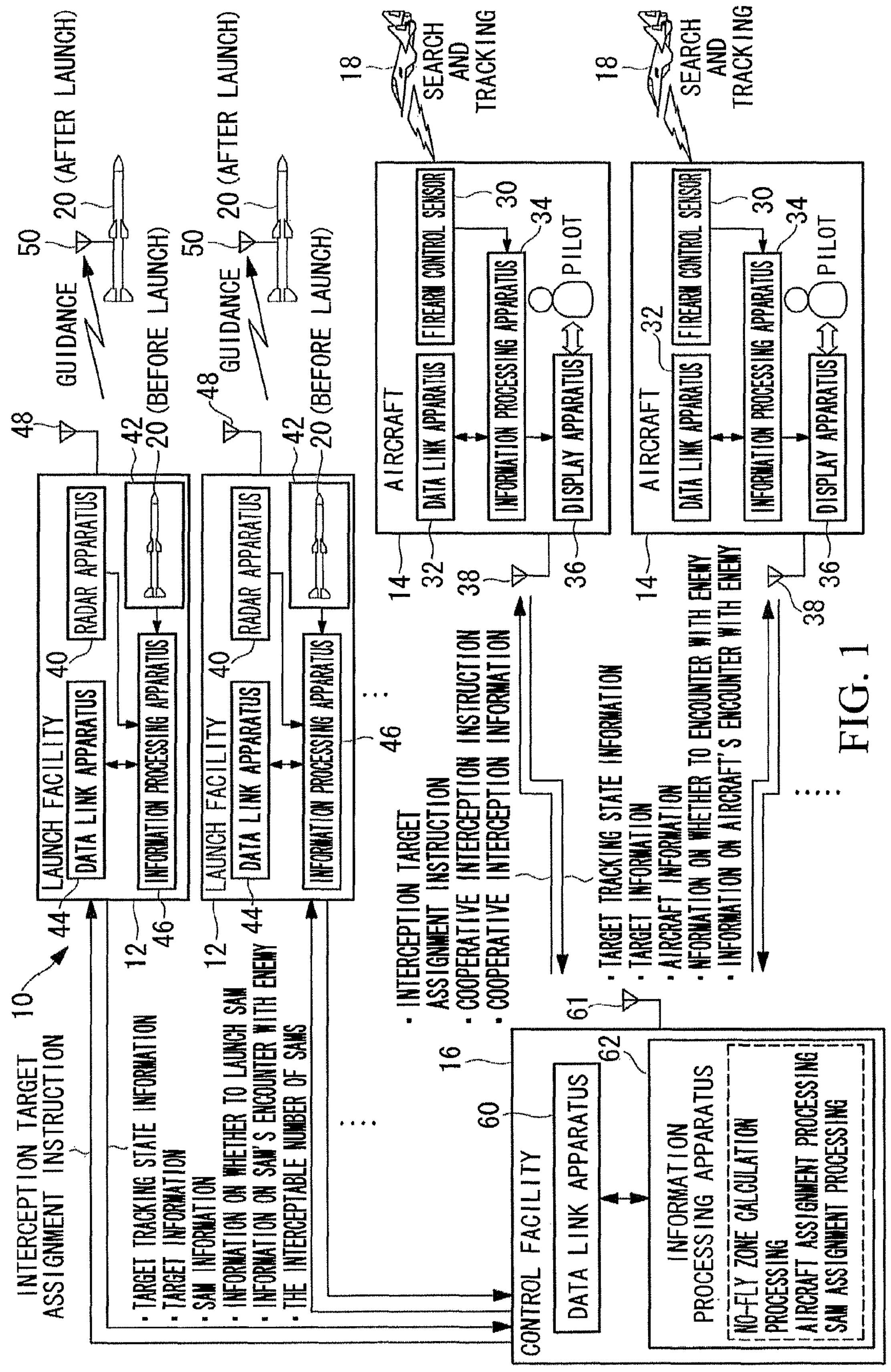
FIG. 1 is a configuration diagram of a cooperative operation system pertaining to an embodiment of the present invention.

FIG. 1 is a configuration diagram of a cooperative operation system 10 pertaining to the embodiment.

The cooperative operation system 10 is provided with: an aircraft 14 that responds to a target moving in the air (search and tracking, interception, etc. of the target); a launch facility 12 that launches a flying object toward the target; and a control facility 16 that controls the aircraft 14 and the flying object.

In the embodiment, the above-described target is assumed to be one or more threatening aircrafts (hereinafter referred to as a "target aircraft 18") as one example, and the above-described flying object is assumed to be a SAM (Surface to Air Missile) 20 launched from the launch facility 12 deployed on the ground to the target aircraft 18. Namely, the launch facility 12 pertaining to the embodiment is a SAM site.

In addition, the control facility 16 may be deployed on the ground, and an aircraft different from an aircraft that intercepts the target aircraft 18 (for example, an AWACS (Airborne Warning And Control System)) may assume a function of the control facility 16.

In FIG. 1, the cooperative operation system 10 is provided with the plurality of aircrafts 14 and the plurality of launch facilities 12 with respect to one control facility 16, but the present invention is not limited to this, and one aircraft 14 may be employed, and one launch facility 12 may be employed.

As shown in FIG. 1, the aircraft 14 is provided with: a firearm control sensor 30; a data link apparatus 32; an information processing apparatus 34; and a display apparatus 36.

The firearm control sensor 30 is a sensor for searching and tracking the target aircraft 18, and is, for example, provided with radar or an IRST (Infra-Red Search and Track system). The aircraft 14 searches and tracks the target aircraft 18 using the firearm control sensor 30, and acquires target information that is the information on the movement of the target aircraft 18. The position (latitude and longitude) of the target aircraft 18, the speed of the target aircraft 18, etc. are included in the target information. In addition, start and end of detection and search and tracking of the target aircraft 18 by the firearm control sensor 30 are output as target tracking state information.

The data link apparatus 32 transmits and receives various information to and from the control facility 16 through an antenna 38.

The information processing apparatus 34 executes various information processing, such as aircraft information generation processing to generate aircraft information including information, such as the position and the speed of the aircraft 14; processing of encounter with enemy to determine whether or not the own aircraft reaches the target aircraft 18 (encounters with an enemy); launch range calculation processing to calculate whether or not a mounted missile reaches the target aircraft 18; and image generation processing to generate an image displayed on the display apparatus 36.

The processing of encounter with enemy determines whether or not the own aircraft encounters with the enemy by, for example, whether or not a moving direction of the target aircraft 18 indicated by the target information and a moving direction of the own aircraft are overlapped in a predetermined range. The information processing apparatus 34 then generates a result of the processing of encounter with enemy as information on whether to encounter with enemy.

In addition, when it is determined by the processing of encounter with enemy that the own aircraft encounters with the enemy, the information processing apparatus 34 calculates information on aircraft's encounter with enemy including a required time (a time of aircraft's encounter with enemy, which is the time when the aircraft 14 encounters with the enemy) for the own aircraft to reach the target aircraft 18, and a position (position of encounter with enemy) where the own aircraft reaches the target aircraft 18, based on a current position and a speed of the target aircraft 18, and a current position and a speed of the own aircraft.

The display apparatus 36 displays a positional relationship between the own aircraft and the target aircraft 18 on a radarscope, or displays information on flying of the own aircraft on the radarscope or another screen.

The launch facility 12 is provided with: a radar apparatus 40; a SAM launching apparatus 42; a data link apparatus 44; and an information processing apparatus 46.

The radar apparatus 40 searches and tracks the target aircraft 18, and acquires target information. Start and end of detection and search and tracking of the target aircraft 18 by the radar apparatus 40 are output as target tracking state information.

One or more SAMs 20 are mounted in the SAM launching apparatus 42, and the SAM launching apparatus 42 launches the SAMs 20 to the target aircraft 18 based on a launch instruction.

The data link apparatus 44 transmits and receives various information to and from the launched SAMs 20 and the control facility 16 through an antenna 48.

The SAM 20 is provided with an antenna 50, and receives the target information from the data link apparatus 44 by the antenna 50. The SAM 20 then flies toward the moving target aircraft 18 based on the received target information, after being launched from the SAM launching apparatus 42 (guidance).

The information processing apparatus 46 executes various processing, such as SAM information generation processing to generate SAM information including information, such as a position and a speed of the SAM 20, processing of whether to launch to determine whether or not the mounted SAM 20 is launched to the target aircraft 18, and launch instruction output processing to output a launch instruction, for launching the SAM 20 to the target aircraft 18, to the SAM launching apparatus 42.

The processing of whether to launch determines whether or not the SAM 20 is launched to the target aircraft 18 by whether or not the target aircraft 18 indicated by the target information is located within a launch range of the SAM 20, and within a coverage of a radar of the radar apparatus 40. The information processing apparatus 46 then generates a result of the processing of whether to launch as information on whether to launch the SAM.

In addition, when it is determined by the processing of whether to launch that the SAM 20 can be launched to the target aircraft 18, the information processing apparatus 46 calculates information on SAM's encounter with enemy including a required time (a time of SAM's encounter with enemy, which is the time when the SAM encounters with the enemy) for the SAM 20 to reach the target aircraft 18, and a position (position of encounter with enemy) where the SAM 20 reaches the target aircraft 18, based on a current position and a speed of the target aircraft 18, and a current position of the launch facility 12 and a speed when the SAM 20 is launched.

The information processing apparatus 46 then calculates the time of SAM's encounter with enemy based on the current position and the speed of the target aircraft 18, and the position of the SAM 20 and the speed of the SAM 20, after launching the SAM 20 to the target aircraft 18.

Furthermore, the information processing apparatus 46 calculates the interceptable number of SAMs, which is the maximum number of interceptions (the maximum number of launches) of the SAM 20 that can be launched continuously to the target aircraft 18, until the target aircraft 18 carries out its own attack mission (attack on a predetermined facility, etc.).

The interceptable number of SAMs is calculated based on the speed and an expected course of the target aircraft 18, and a launch speed of the SAM 20.

The control facility 16 is provided with a data link apparatus 60 and an information processing apparatus 62.

The data link apparatus 60 transmits and receives various information to and from the aircraft 14 and the launch facility 12 through an antenna 61. When the control facility 16 is deployed on the ground, transmission and reception of the various information to and from the launch facility 12 and the control facility 16 may not be performed by the data link apparatus 44 through the antenna 48 and the data link apparatus 60 through the antenna 50, but may be performed by other communication methods, such as by wire communication.

The information processing apparatus 62 executes various processing, such as no-fly zone calculation processing, interception selection processing (aircraft assignment processing and SAM assignment processing), which will be described hereinafter.

Next, action of the cooperative operation system 10 pertaining to the embodiment will be described.

First, the control facility 16 receives the target tracking state information, target information, aircraft information, information on whether to encounter with enemy, information on aircraft's encounter with enemy, etc. from the aircraft 14 through the data link apparatus 60. In addition, the control facility 16 receives the target tracking state information, target information, SAM information, information on whether to launch SAM, information on SAM's encounter with enemy, interceptable number of SAMs, etc. from the launch facility 12 through the data link apparatus 60.

Additionally, in the cooperative operation system 10, the control facility 16 executes various processing using the above-described received various information, and the aircraft 14 and the launch facility 12 respond to the target aircraft 18 based on results of the various processing executed by the control facility 16.

More specifically, the control facility 16 executes the no-fly zone calculation processing to calculate a no-fly zone 66 where a flight of the aircraft 14 is forbidden, and the interception selection processing to select whether the target aircraft 18 is intercepted by the aircraft 14 or by the SAM 20.

Hereinafter, the no-fly zone calculation processing will be described.

In the cooperative operation system 10, in intercepting the target aircraft 18 by cooperative operation of the aircraft 14 and the SAM 20, when the aircraft 14 is located on a course to the target aircraft 18 of the SAM 20, appropriate interception to the target aircraft 18 by the SAM 20 becomes difficult. Consequently, the control facility 16 pertaining to the embodiment calculates the course of the SAM 20 heading for the target aircraft 18 as the no-fly zone 66 of the aircraft 14.

Figure 2:
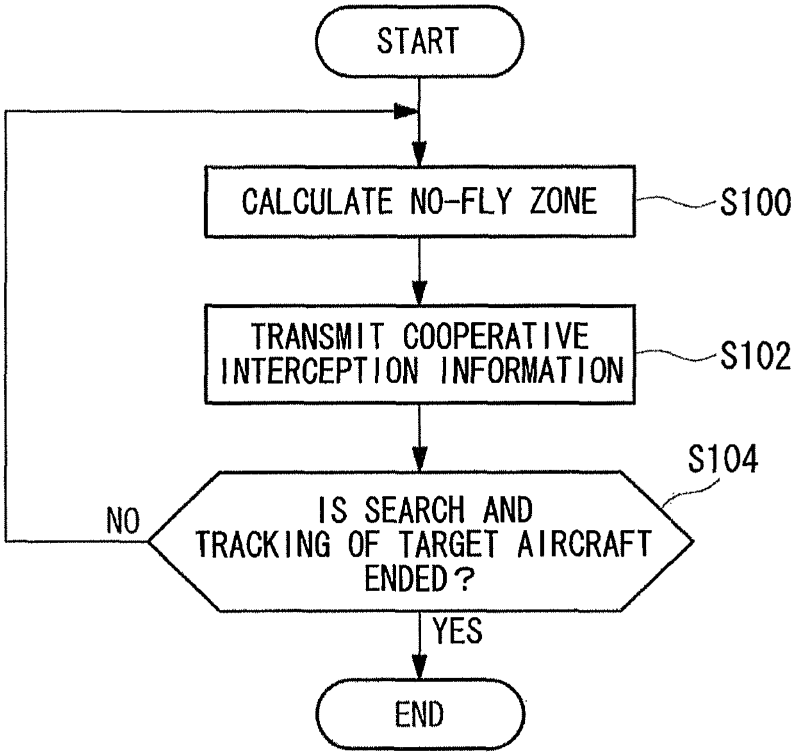
FIG. 2 is a flow chart showing a flow of processing of a no-fly zone calculation program pertaining to the embodiment of the present invention.

FIG. 2 is a flow chart showing a flow of processing of a no-fly zone calculation program executed by the information processing apparatus 62 of the control facility 16, when the no-fly zone calculation processing is executed, and the no-fly zone calculation program is previously stored in a predetermined zone of a storage that is not shown with which the information processing apparatus 62 is provided.

The no-fly zone calculation program is started when the target tracking state information indicating that the target aircraft 18 has been detected from the launch facility 12 is received together with the target information.

First, in step S100, a course of the SAM 20 heading for the target aircraft 18 is calculated based on the target information and the SAM information that have been received from the launch facility 12. In the step S100, for example, a straight line (hereinafter referred to as an "SAM target line") that connects a position of the target aircraft 18 included in the target information and a position of the SAM 20 included in the SAM information is calculated as the course of the SAM 20.

Additionally, in the no-fly zone calculation processing, the calculated course of the SAM 20 is set as the no-fly zone 66 where the flight of the aircraft 14 searching and tracking the target aircraft 18 is forbidden. The no-fly zone 66 is, for example, specified by latitude and longitude.

Figure 3A:
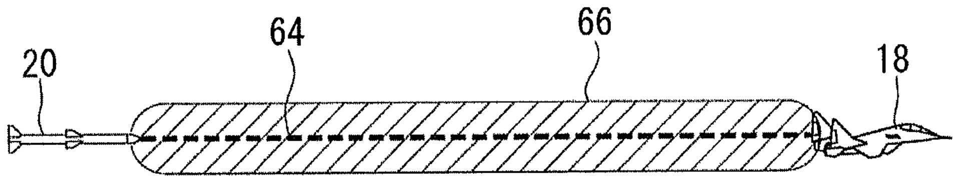
FIG. 3A is a schematic view showing a no-fly zone pertaining to the embodiment of the present invention, in which a predetermined range including an SAM target line is set as the no-fly zone.

In the embodiment, as shown in the schematic view of FIG. 3A, a predetermined zone (for example, a predetermined zone where a SAM target line 64 is set as a central axis) including the SAM target line 64 calculated as the course of the SAM 20 is set as the no-fly zone 66. As a result of this, since a margin of safety in which the aircraft 14 and the SAM 20 do not approach too close to the no-fly zone 66 is included, safety of a flight path of the aircraft 14 can be enhanced.

Although the above-described predetermined zone is previously set, the predetermined zone may be changed, for example, according to a type (destructive power) of the SAM 20, a speed of the SAM 20, etc. For example, the larger the destructive power of the SAM 20 is, or the faster the speed of the SAM 20 is, the more the predetermined zone is extended.

Figure 3B:
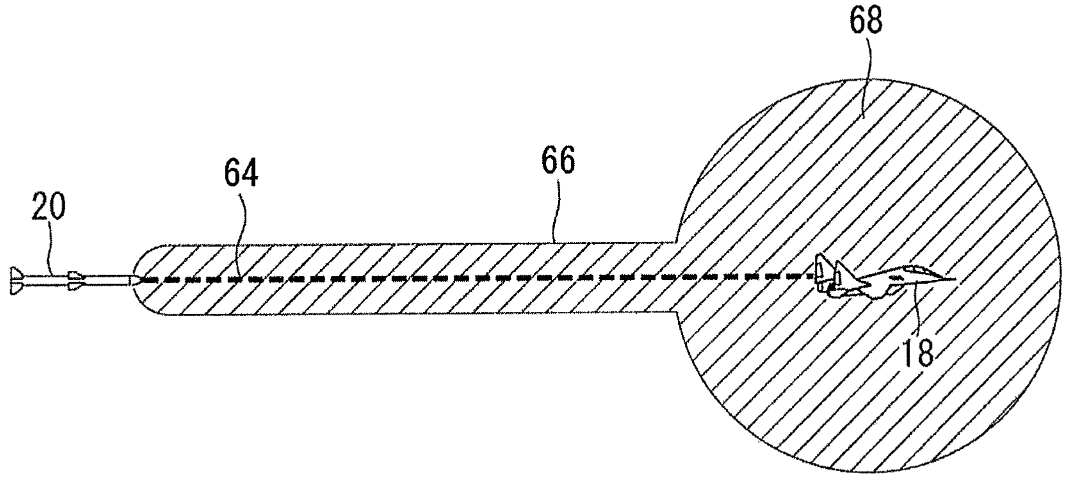
FIG. 3B is a schematic view showing the no-fly zone pertaining to the embodiment of the present invention, in a case where an explosion prediction range is included in the no-fly zone.

In addition, in the no-fly zone 66 pertaining to the embodiment, as shown in a schematic view of FIG. 3B, included is a predetermined zone (hereinafter referred to as a "explosion prediction zone 68") including a position where the SAM 20 reaches the target aircraft 18. When the SAM 20 reaches the target aircraft 18, i.e., the SAM 20 shoots down the target aircraft 18, the target aircraft 18 is exploded, and thus when the aircraft 14 approaches the target aircraft 18 too close, the aircraft 14 may be involved in the explosion of the target aircraft 18.

Therefore, in the embodiment, in order to prevent the aircraft 14 from being involved in the explosion of the target aircraft 18, a possible zone where the target aircraft 18 may be scattered by the explosion is set as the explosion prediction zone 68, and is included in the no-fly zone 66. As a result of this, safety of the flight path of the aircraft 14 can be enhanced.

Although the explosion prediction zone 68 is previously set, an explosion prediction zone may be changed, for example, according to a type (destructive power) of the SAM 20, a type of the target aircraft 18, etc. For example, the larger the destructive power of the SAM 20 is, or the larger a size of the target aircraft 18 is, the more the explosion prediction zone is extended. The explosion prediction zone 68 may, as shown in FIG. 3B, have a circular shape centered on the position of the target aircraft 18, or may have a polygonal shape.

Figure 3C:
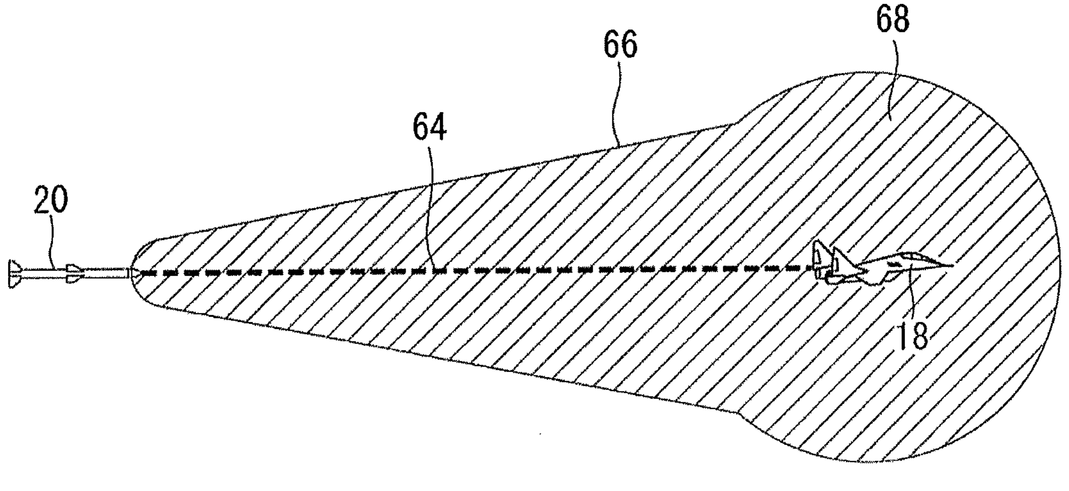
FIG. 3C is an example showing the no-fly zone pertaining to the embodiment of the present invention, in which a no-fly zone of a target aircraft side is extended.

Furthermore, the no-fly zone 66 may be, as shown in the schematic view of FIG. 3C, extended toward the target aircraft 18. The target aircraft 18 is moving, and a moving range thereof is also difficult to predict. Therefore, the no-fly zone 66 is extended toward the target aircraft 18, and thereby safety of the flight path of the aircraft 14 can be even further enhanced. Extension of the no-fly zone 66 may be, as shown in FIG. 3C, continuous, or, for example, the no-fly zone 66 may be gradually extended in a step-wise manner.

In next step S102, cooperative interception information is transmitted to the aircraft 14 through the data link apparatus 60. The cooperative interception information includes: information indicating the no-fly zone 66, the SAM information that the control facility 16 has received from the launch facility 12, the target information, and the information on SAM's encounter with enemy.

In next step S104, it is determined whether or not search and tracking of the target aircraft 18 have ended based on target tracking information received from the launch facility 12, and if affirmative determination is made, the program is ended. Meanwhile, if negative determination is made, the program returns to step S100, and the no-fly zone 66 is calculated based on the newly received target information and SAM information. A case where search and tracking of the target aircraft 18 has ended means the case where the target aircraft 18 left out of the coverage of the radar apparatus 40 with which the launch facility 12 is provided, and a case where the target aircraft 18 is shot down by the SAM 20 or the aircraft 14.

Figure 4A:
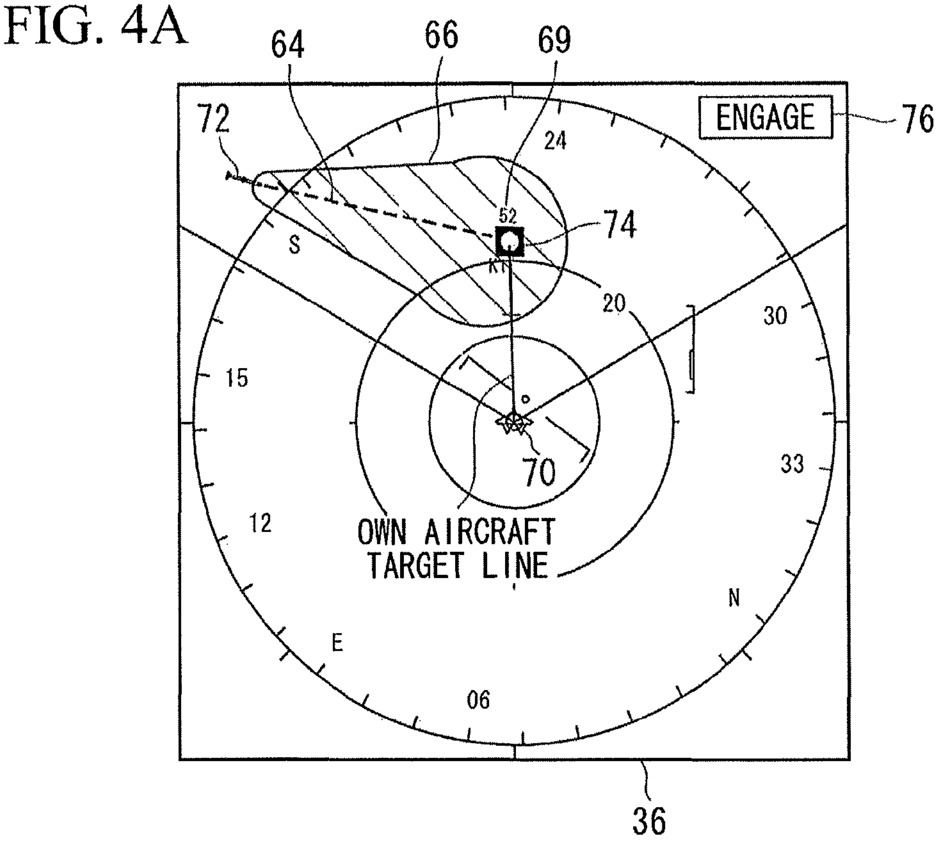
FIG. 4A is a schematic view showing an image before a SAM is launched from a launching apparatus, the image being displayed on a display apparatus mounted in an aircraft pertaining to the embodiment of the present invention.
Figure 4B:
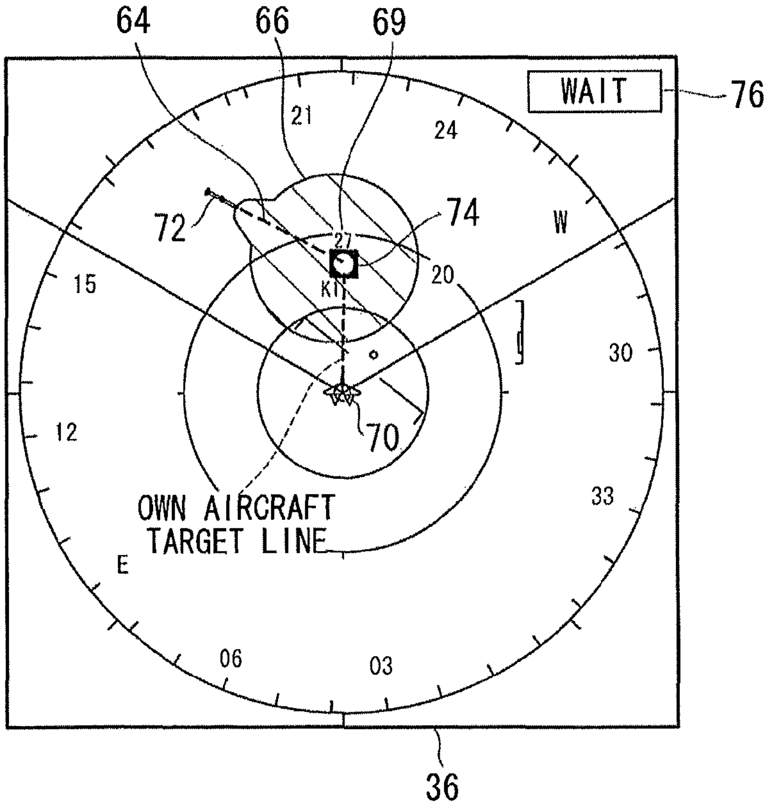
FIG. 4B is a schematic view showing an image after the SAM is launched from the launching apparatus, the image being displayed on the display apparatus mounted in the aircraft pertaining to the embodiment of the present invention.

FIGS. 4A and 4B show images displayed on a radarscope of the display apparatus 36 of the aircraft 14.

The images shown in FIGS. 4A and 4B are images generated by image generation processing executed by the information processing apparatus 34, based on the cooperative interception information that the aircraft 14 has received from the control facility 16 through the data link apparatus 32.

An own aircraft symbol 70 indicating the own aircraft that is the aircraft 14 is displayed on centers of the images shown in FIGS. 4A and 4B, and a SAM symbol 72 indicating the SAM 20, and a target symbol 74 indicating the target aircraft 18 are displayed centered on the own aircraft. The target symbol 74 may be displayed based on the target information acquired by the firearm control sensor 30 of the own aircraft, or may be displayed based on the target information acquired by the radar apparatus 40 of the launch facility 12 that is included in the cooperative interception information received from the control facility 16. Meanwhile, the SAM symbol 72 is displayed based on the SAM information included in cooperative interception information. In addition, a time (hereinafter referred to as a "TOF (Time Of Flight) 69") until the SAM 20 reaches the target aircraft 18 is displayed near the target symbol 74.

The TOF 69 is calculated by the information processing apparatus 34 with which the aircraft 14 is provided, based on the time of SAM's encounter with enemy included in the information on SAM's encounter with enemy received from the control facility 16.

Additionally, whenever the aircraft 14 receives cooperative interception information from the control facility 16, the information processing apparatus 34 updates an image displayed on the display apparatus 36 based on the cooperative interception information.

FIG. 4A is one example of the schematic view showing the image displayed on the display apparatus 36, when the SAM 20 has not yet been launched from the launch facility 12.

Meanwhile, FIG. 4B shows a case where the SAM 20 has been launched from the launch facility 12, and is one example of the schematic view showing the image displayed on the display apparatus 36 when the SAM 20 has been launched from the launch facility 12.

As shown in FIG. 4B, since the SAM 20 is launched, and the SAM 20 is approaching the target aircraft 18, the no-fly zone 66 becomes narrower, and the TOF 69 also becomes shorter compared with the image shown in FIG. 4A. In addition, although the target aircraft 18 is also approaching the own aircraft, the explosion prediction zone 68 does not change. Therefore, the pilot of the own aircraft can recognize the necessity of immediately leaving from the target aircraft 18 so as not to be involved in the explosion of the target aircraft 18.

In addition, on the display apparatus 36 of the aircraft 14, a content of the cooperation interception instruction indicating whether to intercept the target aircraft 18 by the own aircraft is displayed on an instruction display unit 76.

In the example shown in FIG. 4A, the own aircraft intercepts the target aircraft 18, and thus "ENGAGE" indicating interception is displayed on the instruction display unit 76. When "ENGAGE" is displayed on the instruction display unit 76, the pilot of the own aircraft intercepts the target aircraft 18 using firearms, such as an AAM (Air to Air Missile) mounted in the own aircraft.

Meanwhile, in the example shown in FIG. 4B, the SAM 20 intercepts the target aircraft 18, and thus "WAIT" indicating wait is displayed on the instruction display unit 76. When "WAIT" is displayed on the instruction display unit 76, the pilot of the own aircraft slows down the own aircraft or otherwise delays encounter with the enemy of the own aircraft. When "WAIT" is displayed on the instruction display unit 76, interception of the target aircraft 18 by the SAM 20 is performed.

Furthermore, when the own aircraft intercepts the target aircraft 18, i.e., when the instruction display unit 76 displays "ENGAGE", a straight line (hereinafter referred to as an "own aircraft target line") that connects the own aircraft and the target aircraft 18 makes a continuous line as one example. Meanwhile, when the own aircraft does not intercept the target aircraft 18, i.e., when the instruction display unit 76 displays "WAIT", the own aircraft target line makes a broken line as one example. The own aircraft target line may just differ in a display method thereof respectively when the own aircraft intercepts the target aircraft 18, and when the own aircraft does not intercept the target aircraft 18. For example, the following methods etc. may be employed: while the own aircraft target line flashes when the own aircraft intercepts the target aircraft 18, it does not flash when the own aircraft does not intercept the target aircraft 18; and while the own aircraft target line is indicated in red when the own aircraft intercepts the target aircraft 18, it is indicated in black when the own aircraft does not intercept the target aircraft 18.

The images shown in FIGS. 4A and 4B are images displayed on the display apparatus 36 of the aircraft 14 to which interception to the target aircraft 18 has been assigned (hereinafter referred to as an "assigned aircraft"). Although, as one example, on the display apparatus 36 of the aircraft 14 to which interception to the target aircraft 18 has not been assigned, "WAIT" is always displayed on the instruction display unit 76, the no-fly zone 66 is displayed similarly to the assigned aircraft.

In addition, the control facility 16 executes interception selection processing in order to transmit the above-described cooperation interception instruction to the aircraft 14 and the launch facility 12.

The interception selection processing selects whether the target aircraft 18 is intercepted by the aircraft 14 or by the SAM 20, based on the time of aircraft's encounter with enemy included in the information on aircraft's encounter with enemy that has been received from the aircraft 14, and the time of SAM's encounter with enemy included in the information on SAM's encounter with enemy that has been received from the launch facility 12.

More specifically, for example, when the time of aircraft's encounter with enemy is earlier than the time of SAM's encounter with enemy, the interception selection processing mainly selects interception to the target aircraft 18 by the aircraft 14, and when the time of SAM's encounter with enemy is earlier than the time of aircraft's encounter with enemy, the interception selection processing mainly selects interception to the target aircraft 18 by the SAM 20. Additionally, the interception selection processing pertaining to the embodiment executes aircraft assignment processing to assign to the aircraft 14 the target aircraft 18 that is a target of interception, and SAM assignment processing to assign to the SAM 20 the target aircraft 18 as the target of interception, and thereby selects whether the target aircraft 18 is intercepted by the aircraft 14 or by the SAM 20.

Figure 5:
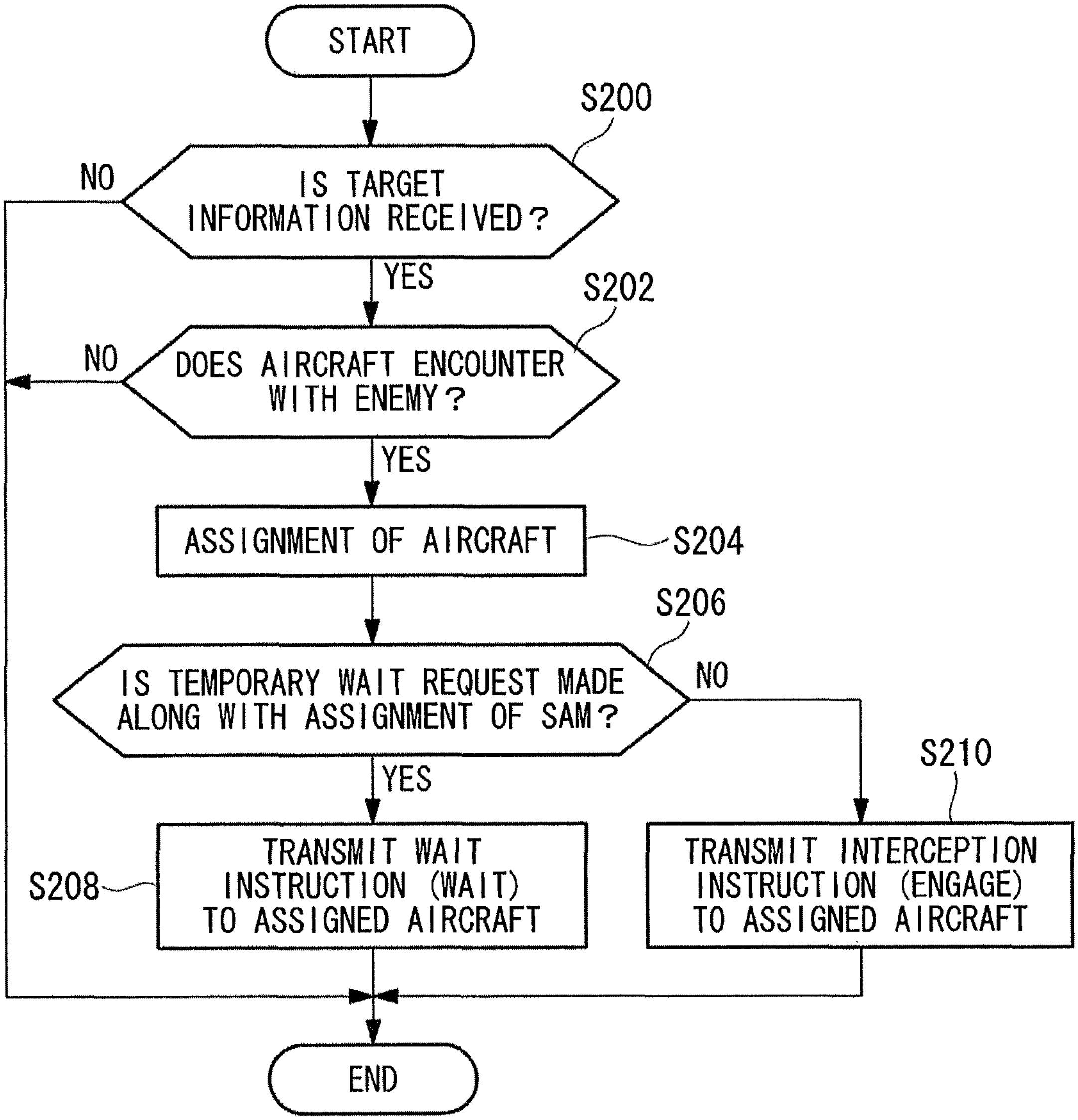
FIG. 5 is a flow chart showing a flow of processing of an aircraft assignment program pertaining to the embodiment of the present invention.

FIG. 5 is a flow chart showing a flow of processing of an aircraft assignment program executed by the information processing apparatus 62 of the control facility 16, when aircraft assignment processing is executed, and the aircraft assignment program is previously stored in a predetermined zone of the storage that is not shown with which the information processing apparatus 62 is provided. The aircraft assignment program is, as one example, repeatedly executed for each predetermined time interval.

First, in step S200, it is determined whether or not the target tracking state information indicating that the target aircraft 18 has been detected has been received together with the target information from at least either the aircraft 14 or the launch facility 12. If affirmative determination is made, the program proceeds to step S202, and if negative determination is made, the program is ended since the target aircraft 18 as the target of interception does not exist.

In step S202, it is determined whether or not the aircraft 14 encounters with the enemy based on the information on whether to encounter with enemy received from the aircraft 14. If affirmative determination is made, the program proceeds to step S204, and if negative determination is made, the program is ended since the detected target aircraft 18 is not the target of interception.

In step S204, the aircraft 14 that intercepts the target aircraft 18 is assigned. When the cooperative operation system 10 is provided with the plurality of aircrafts 14, the aircraft 14 that intercepts the target aircraft 18 is assigned, for example, based on a distance with the target aircraft 18, the number of remaining bullets of the AAM, an amount of residual fuel, etc.

Additionally, in the aircraft assignment processing, information on the target aircraft 18 as the target of interception is transmitted from the control facility 16 to the aircraft 14 set as the assigned aircraft, together with an interception target assignment instruction indicating that the aircraft 14 has been set as the assigned aircraft.

In next step S206, it is determined whether or not a temporary wait request in which interception to the target aircraft 18 is temporarily made to wait has been output by SAM assignment processing that will be described hereinafter. If affirmative determination is made, the program proceeds to step S208, and if negative determination is made, the program proceeds to step S210. In the step S206, determination processing is performed using a result of the SAM assignment processing, and thus the determination processing is performed after the SAM assignment processing is ended.

In step S208, a wait instruction for displaying "WAIT" on the instruction display unit 76 as the cooperation interception instruction is transmitted to the assigned aircraft, and then the program is ended.

In step S210, an interception instruction for displaying "ENGAGE" on the instruction display unit 76 as the cooperation interception instruction is transmitted to the assigned aircraft, and then the program is ended.

Figure 6:
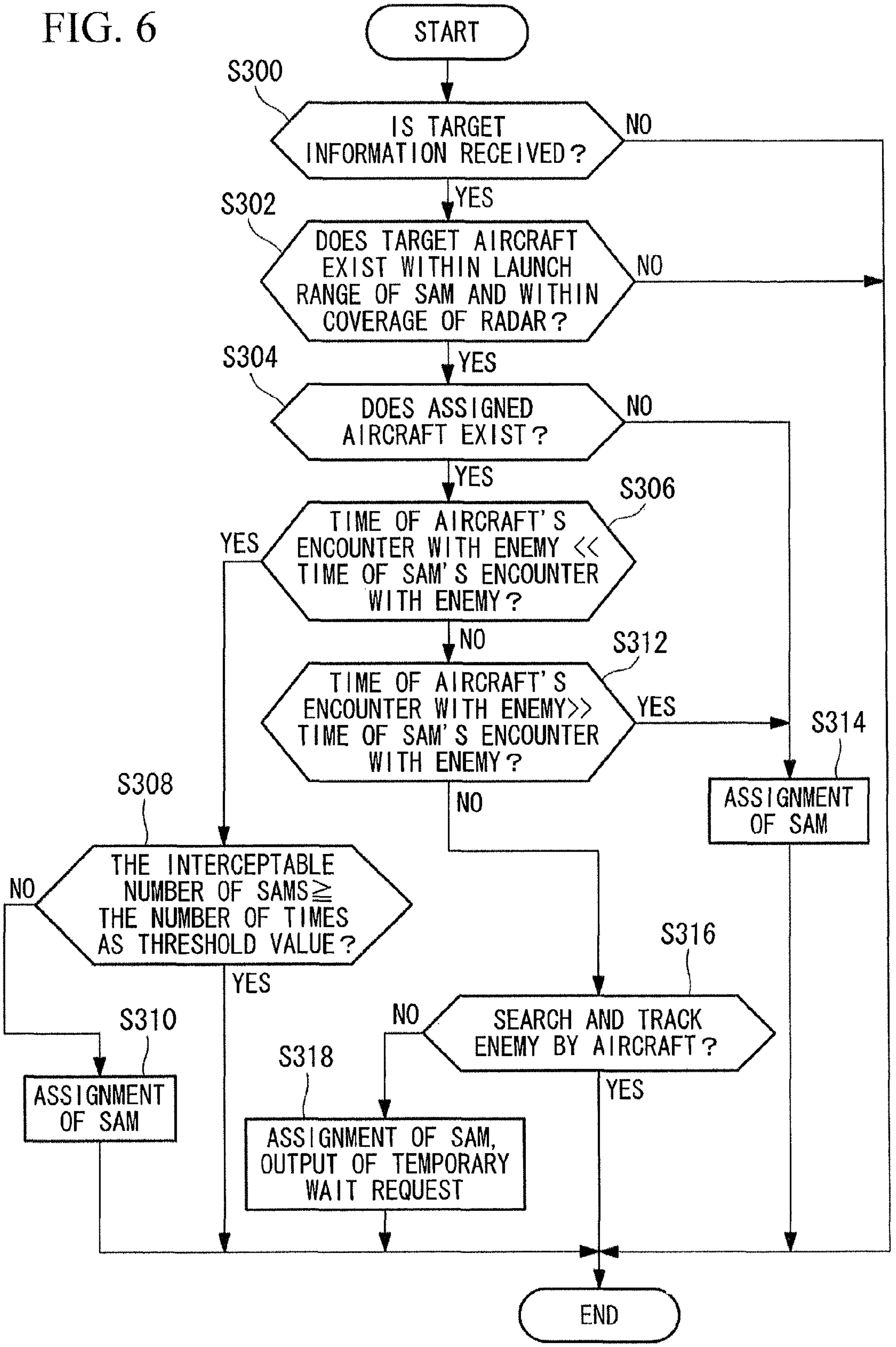
FIG. 6 is a flow chart showing a flow of processing of a SAM assignment program pertaining to the embodiment of the present invention.

FIG. 6 is a flow chart showing a flow of processing of a SAM assignment program executed by the information processing apparatus 62 of the control facility 16, when SAM assignment processing is executed, and the SAM assignment program is previously stored in a predetermined zone of the storage that is not shown with which the information processing apparatus 62 is provided. The SAM assignment program is, as one example, repeatedly executed for each predetermined time interval at a same timing as the start of the aircraft assignment program.

First, in step S300, it is determined whether or not the target tracking state information indicating that the target aircraft 18 has been detected has been received together with the target information from at least either the aircraft 14 or the launch facility 12. If affirmative determination is made, the program proceeds to step S302, and if negative determination is made, the program is ended since the target aircraft 18 as the target of interception does not exist.

In step S302, it is determined whether or not the target aircraft 18 indicated by the target information is located within the launch range of the SAM 20, and within the coverage of the radar of the radar apparatus 40, based on the information on whether to launch SAM received from the launch facility 12. If affirmative determination is made, the program proceeds to step S304, and if negative determination is made, the program is ended without assigning the SAM 20 that intercepts the target aircraft 18.

In step S304, it is determined whether or not the assigned aircraft exists. If affirmative determination is made, the program proceeds to step S306, and if negative determination is made, the program proceeds to step S314. The step is performed after processing in step S204 in the above-mentioned aircraft assignment program is ended.

In step S306, it is determined whether or not the time of aircraft's encounter with enemy of the assigned aircraft is earlier than the time of SAM's encounter with enemy. If affirmative determination is made, the program proceeds to step S308, and if negative determination is made, the program proceeds to step S312. More specifically, in the step S306, when the time of aircraft's encounter with enemy of the assigned aircraft is earlier than the time of SAM's encounter with enemy by not less than a previously set predetermined time, affirmative determination is made.

When the cooperative operation system 10 is provided with the plurality of launch facilities 12, for example, a time of SAM's encounter with enemy when the SAM encounters with the enemy earliest may be used as the time of SAM's encounter with enemy, or a time of SAM's encounter with enemy of the launch facility 12 having the largest number of remaining bullets of the SAM 20, etc. may be used.

In step S308, it is determined whether or not the interceptable number of SAMs received from the launch facility 12 is not less than the previously set number of times as a threshold value. If affirmative determination is made, the SAM 20 that intercepts the target aircraft 18 is not assigned, i.e., only the assigned aircraft intercepts the target aircraft 18, and the program is ended, and if negative determination is made, the program proceeds to step S310.

In step S310, the SAM 20 (launch facility 12) that intercepts the target aircraft 18 is assigned, and the program is ended.

In the step S310, even though the SAM 20 is assigned, the assigned aircraft is more likely to shoot down the target aircraft 18 since the assigned aircraft 14 is approaching the target aircraft 18. Therefore, the launched SAM 20 may become useless. However, in the cooperative operation system 10 pertaining to the embodiment, the number of interceptions by the SAM 20 is not more than the threshold value, there are relatively few SAMs 20 to be launched, and thus the SAM 20 is assigned to the interception of the target aircraft 18. Accordingly, the cooperative operation system 10 pertaining to the embodiment can further enhance the probability of shooting down the target aircraft 18.

Step S312 is, as mentioned above, the step to which the program proceeds if negative determination is made in step S306. Additionally, in step S312, it is determined whether or not the time of SAM's encounter with enemy is earlier than the time of aircraft's encounter with enemy of the assigned aircraft. If affirmative determination is made, the program proceeds to step S314, and if negative determination is made, the program proceeds to step S316. More specifically, in the step S312, when the time of SAM's encounter with enemy is earlier than the time of aircraft's encounter with enemy of the assigned aircraft by not less than a previously set predetermined time, affirmative determination is made.

Step S314 is, as mentioned above, the step to which the program proceeds when negative determination is made in step S312, and also when negative determination is made in step S304. In step S314, the SAM 20 (launch facility 12) that intercepts the target aircraft 18 is assigned, and the program is ended.

When the program proceeds from step S312 to the step 314, the target aircraft 18 is intercepted by the aircraft 14 and the SAM 20. In this case, the cooperative operation system 10 is more likely to shoot down the target aircraft 18 by the SAM 20, but when the target aircraft 18 could not be shot down by the SAM 20, it is succeedingly intercepted by the aircraft 14.

Step S316 is the step to which the program proceeds when a difference between the time of aircraft's encounter with enemy of the assigned aircraft and the time of SAM's encounter with enemy falls within a predetermined time, i.e., when the difference is the same or a little. In step S316, it is determined whether or not the aircraft 14 is searching and tracking the target aircraft 18 as the enemy. If affirmative determination is made, the SAM 20 that intercepts the target aircraft 18 is not assigned, i.e., only the assigned aircraft intercepts the target aircraft 18, and the program is ended Meanwhile, if negative determination is made, the program proceeds to step S318.

In step S318, the SAM 20 (launch facility 12) that intercepts the target aircraft 18 is assigned, also a temporary wait request to the assigned aircraft is output, and the program is ended.

A case where the program proceeds to the step S318 means the case where the launch facility 12 is searching and tracking the target aircraft 18 as the enemy. In this case, the aircraft 14 intercepts the target aircraft 18 based on the target information acquired by the radar apparatus 40 with which the launch facility 12 is provided, and accuracy of shooting down the target aircraft 18 may be more deteriorated compared with a case where the aircraft 14 is searching and tracking the target aircraft 18.

Therefore, in the cooperative operation system 10 pertaining to the embodiment, the assigned aircraft is made to wait temporarily, i.e., "WAIT" is made to be displayed on the instruction display unit 76 of the display apparatus 36 of the assigned aircraft 14, and interception of the target aircraft 18 by the SAM 20 is tried. Additionally, after the time of SAM's encounter with enemy elapses, and when the SAM 20 fails to shoot down the target aircraft 18, the cooperative operation system 10 makes "ENGAGE" to be displayed on the instruction display unit 76 of the display apparatus 36 of the assigned aircraft 14, makes the assigned aircraft 14 intercept the target aircraft 18, and enhances a probability of shooting down the target aircraft 18.

As described above, the control facility 16 pertaining to the embodiment receives the target information including information indicating the position of the target aircraft 18 moving in the air, and the SAM information including information indicating the position of the SAM 20 launched from the launch facility 12 toward the target aircraft 18. The control facility 16 then calculates a course of the SAM 20 heading for the target aircraft 18 based on the received target information and SAM information as the no-fly zone 66 of the aircraft 14 that responds to the target aircraft 18.

Accordingly, since the control facility 16 pertaining to the embodiment can appropriately determine the flight path of the aircraft 14 by the pilot of the aircraft 14, the aircraft 14 and the SAM 20 launched from the launch facility 12 can cooperatively appropriately respond to the target aircraft 18.

In addition, since the no-fly zone 66 includes a predetermined zone including the SAM target line 64 indicating the course of the SAM 20 heading for the target aircraft 18, the margin of safety in which the aircraft 14 and the SAM 20 do not approach too close to the no-fly zone 66, and safety of the flight path of the aircraft 14 can be more enhanced.

In addition, since the no-fly zone 66 includes the explosion prediction zone 68 including the position where the SAM 20 reaches the target aircraft 18, safety of the flight path of the aircraft 14 can be more enhanced.

In addition, since the control facility 16 pertaining to the embodiment selects whether the target aircraft 18 is intercepted by the aircraft 14 or by the SAM 20, based on the time of aircraft's encounter with enemy and the time of SAM's encounter with enemy, it is not necessary to determine whether or not interception to the target aircraft 18 by the pilot of the aircraft 14 is needed, and the target aircraft 18 can be shot down easily and sooner.

In addition, since the display apparatus 36 mounted in the aircraft 14 pertaining to the embodiment displays a positional relationship between the own aircraft and the target aircraft 18, and also the no-fly zone 66 calculated by the control facility 16, the pilot of the aircraft 14 can easily and reliably confirm the no-fly zone 66 of the own aircraft.

In addition, since the display apparatus 36 mounted in the aircraft 14 pertaining to the embodiment displays a selection result of the interception selection processing by the control facility 16, the pilot of the aircraft 14 can easily and reliably confirm whether or not the own aircraft intercepts the target aircraft 18.

Hereinbefore, the present invention has been described using the above-described embodiment, but a technical scope of the present invention is not limited to a range set forth in the above-described embodiment. A wide variety of changes or improvements can be added to the above-described embodiment without departing from the spirit of the invention, and the changed or improved mode is also included in the technical scope of the present invention.

For example, in the above-described embodiment, a mode has been described in which the no-fly zone calculation processing is executed by the information processing apparatus 62 with which the control facility 16 is provided, but the present invention is not limited to this, and a mode may be employed in which the information processing apparatus 34 with which the aircraft 14 is provided is made to have a function as the control facility 16, and the no-fly zone calculation processing is executed by the aircraft 14. In a case of the mode, the information processing apparatus 34 with which the aircraft 14 is provided receives various information from the launch facility 12 or the control facility 16 through the data link apparatus 32, and executes the no-fly zone calculation processing based on the received information.

In addition, in the above-described embodiment, a mode has been described in which the launch facility 12 is deployed on the ground, and in which the SAM 20 is launched from the launch facility 12 to the target aircraft 18, but the present invention is not limited to this, and in another mode, the launch facility 12 may be assumed to be a ship or a submarine, and a SAM (Ship to Air Missile) may be launched to the target aircraft 18.

In addition, in the above-described embodiment, a mode has been described in which search and tracking of the target aircraft 18 are performed by the aircraft 14 and the launch facility 12, but the present invention is not limited to this, and a mode may also be employed in which search and tracking of the target aircraft 18 are performed by the control facility 16 (for example, the AWACS).

In addition, in the above-described embodiment, a mode has been described in which the aircraft 14 is assumed to be an aircraft (a fighter) that can intercept the target aircraft 18, the present invention is not limited to this, and the aircraft 14 may also be assumed to be an aircraft (for example, the AWACS or an AEW (Airborne Early Warning) that does not have interception capability, but performs only search and tracking. In a case of the form, only cooperative interception information is transmitted to the aircraft that performs only search and tracking without an interception target assignment instruction and a cooperative interception instruction being transmitted, and the no-fly zone 66 is displayed on the display apparatus 36 with which the aircraft that performs only search and tracking is provided.

In addition, the flow of processing of the aircraft assignment program and the SAM assignment program that have been described in the above-described embodiment is also one example, and an unnecessary step may be eliminated, a new step may be added, or a processing order may be changed without departing from the spirit of the present invention.

REFERENCE SIGNS LIST

10 cooperative operation system
12 launch facility
14 aircraft
16 control facility
18 target aircraft
20 SAM
60 data link apparatus
62 information processing apparatus
64 SAM target line
66 no-fly zone
68 explosion prediction zone

The invention claimed is:

1. A cooperative operation control apparatus comprising:

an acquisition unit that acquires target information including information indicating a position of a target moving in the air, and flying object information including information indicating a position of a flying object launched from a launch facility toward the target;

a calculation unit that calculates, as a no-fly zone where a flight of an aircraft that responds to the target is forbidden, a course of the flying object heading for the target based on the target information and the flying object information that have been acquired by the acquisition unit, wherein the no-fly zone is a predetermined zone including a straight line indicating the course of the flying object heading for the target; and a display apparatus mounted in an aircraft and displaying the no-fly zone together with a positional relationship between the aircraft and the target.

2. The cooperative operation control apparatus according to claim 1, wherein the no-fly zone includes a predetermined zone including a position where the flying object reaches the target.

3. The cooperative operation control apparatus according to claim 1, wherein the calculation unit executes interception selection processing to select whether the target is intercepted by the aircraft or by the flying object, based on a first required time for the aircraft to reach the target, and a second required time for the flying object to reach the target.

4. The cooperative operation control apparatus according to claim 1, the calculation unit is operable to execute interception selection processing to select whether the target is intercepted by the aircraft or by the flying object, based on a first required time for the aircraft to reach the target, and a second required time for the flying object to reach the target.

5. A cooperative operation system comprising:

a control facility;

an aircraft that responds to a target moving in the air, and can transmit and receive various information to and from the control facility; and a launch facility that launches a flying object toward the target, and is capable of transmitting and receiving various information to and from the control facility, wherein the control facility includes a control apparatus comprising:

an acquisition unit that acquires target information including information indicating a position of the target moving in the air, and flying object information including information indicating a position of the flying object launched from the launch facility toward the target; and a calculation unit that calculates, as a no-fly zone where a flight of the aircraft that responds to the target is forbidden, a course of the flying object heading for the target based on the target information and the flying object information that have been acquired by the acquisition unit, wherein the no-fly zone is a predetermined zone including a straight line indicating the course of the flying object heading for the target.

6. A control method comprising:

a first step of acquiring target information including information indicating a position of a target moving in the air, and flying object information including information indicating a position of a flying object launched from a launch facility toward the target;

a second step of calculating as a no-fly zone where a flight of an aircraft that responds to the target is forbidden a course of the flying object heading for the target based on the acquired target information and flying object information;

a third step of setting the no-fly zone calculated in the second step as a predetermined zone including a straight line indicating the course of the flying object heading for the target; and a fourth step of displaying the no-fly zone on a display device mounted in the aircraft.

* * * * *